(12) United States Patent
Borse (10) Patent No.: US 10,798,237 B2
(45) Date of Patent: Oct. 6, 2020

(54) AUTOMATED INDIVIDUAL SECURITY

(71) Applicant: INTERNATIONAL BUSINESS MACHINES CORPORATION, Armonk, NY (US)

(72) Inventor: Santosh S. Borse, Westchester, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/172,807

(22) Filed: Oct. 28, 2018

(65) Prior Publication Data

US 2020/0137212 A1   Apr. 30, 2020

(51) Int. Cl.
*H04M 1/725* (2006.01)
*B64C 39/02* (2006.01)
(Continued)

(52) U.S. Cl.
CPC ......... *H04M 1/72538* (2013.01); *A44C 25/00* (2013.01); *B64C 39/028* (2013.01); *G06F 1/163* (2013.01); *G06K 9/00664* (2013.01); *G08B 21/02* (2013.01); *B64C 2201/08* (2013.01); *B64C 2201/122* (2013.01); *B64C 2201/141* (2013.01)

(58) Field of Classification Search
CPC .. H04M 1/72538; A44C 25/00; B64C 39/028; B64C 2201/08; B64C 2201/122; B64C 2201/141; G06F 1/163; G06K 9/00664; G08B 21/02
See application file for complete search history.

(56) References Cited

U.S. PATENT DOCUMENTS

| 8,013,734 B2 | 9/2011 | Saigh et al. |
| 9,599,992 B2 | 3/2017 | Kohstall et al. |

(Continued)

FOREIGN PATENT DOCUMENTS

| CN | 105416578 | 4/2017 |
| WO | 2016145411 | 9/2016 |

OTHER PUBLICATIONS

V. Raju, "Could drones protect India's women from rapists?" Sep. 9, 2016, accessed from the internet Feb. 2, 2018 from < https://www.weforum.org/agenda/2016/09/could-drones-protect-india-s-women-from-rapists>, 3 pages.

(Continued)

*Primary Examiner* — Mohamed Barakat
(74) *Attorney, Agent, or Firm* — Feb Cabrasawan; Amy J. Pattillo (57) ABSTRACT

A controller monitors for an activation condition through a monitoring interface of a wearable aerial device. In response to detecting the activation condition through the monitoring interface, the controller triggers the wearable aerial device to release from an aesthetic attachment proximate to a user and hover a distance above the user of a height above a selected height threshold. The controller analyzes a recording of content by the wearable aerial device to assess a particular threat level associated with the content from among multiple threat levels. The controller, in response to the particular threat level exceeding a threat threshold, automatically sends a communication to one or more emergency contacts.

16 Claims, 5 Drawing Sheets

(51) Int. Cl.
*G08B 21/02* (2006.01)
*G06K 9/00* (2006.01)
*A44C 25/00* (2006.01)
*G06F 1/16* (2006.01)

(56) References Cited

U.S. PATENT DOCUMENTS

| | | | | |
|---|---|---|---|---|
| 2010/0066558 | A1 | 3/2010 | McCauley et al. | |
| 2010/0279649 | A1 | 11/2010 | Thomas | |
| 2011/0046920 | A1 | 2/2011 | Amis et al. | |
| 2016/0042637 | A1* | 2/2016 | Cahill | G08B 25/10 701/3 |
| 2016/0101856 | A1* | 4/2016 | Kohstall | G05D 1/101 244/17.13 |
| 2017/0092109 | A1* | 3/2017 | Trundle | G08B 25/006 |
| 2017/0108878 | A1* | 4/2017 | Krispin | G06F 1/163 |
| 2017/0161561 | A1 | 6/2017 | Marty et al. | |
| 2017/0193308 | A1* | 7/2017 | Buyse | B64C 39/024 |
| 2018/0203470 | A1* | 7/2018 | Pattison | G05D 1/12 |

OTHER PUBLICATIONS

A. Narain, "Wearable Rape Sensor to detect assault in real time!" Jul. 29, 2017, accessed from the internet Feb. 2, 2018 from <https://www.geospatialworld.net/blogs/wearable-rape-sensor/>, 3 pages.

L. Cucullu, "This startup has a smart ring designed to keep you safe." Jun. 28, 2016, accessed from the internet Feb. 2, 2018 from <https://www.cnet.com/news/silicon-valley-wearables-company-nimb-hopes-smart-ring-will-keep-you-safe/>, 3 pages.

B. Kim, "Getting home safely with drone." In Proceedings of the 2016 ACM International Joint Conference on Pervasive and Ubiquitous Computing: Adjunct (UbiComp '16). ACM, New York, NY, USA, 117-120. 2016, 4 pages.

H. Kao, "Exploring Interactions and Perceptions of Kinetic Wearables." In Proceedings of the 2017 Conference on Designing Interactive Systems (DIS '17). ACM, New York, NY, USA, 391-396. 2017, 6 pages.

Anonymous "Personal iDrone with Wearable Docking-and-Release Station for Hands Free Drone Usage." IP.com Disclosure No. IPCOM000246322D, Publication Date: May 30, 2016, 5 pages.

Anonymous, "Autonomous Wearable UAV Dock." IP.com Disclosure No. IPCOM000248377D, Publication Date: Nov. 22, 2016, 3 pages.

Murison, Malek, "Axis-Vidius—A Review of the World's Smallest FPV Done", Drone Life, Mar. 29, 2016, accessed via the Internet from <https://dronelife.com/2016/03/29/axis-vidius-review-smallest-fpv-drone/>, 6 pages.

Prigg, Mark, "The app controlled smart security drone with a STUN GUN built in to zap intruders with an 80,000 volt dart", Daily Mail.com, Mar. 8, 2014, 47 pages.

"Personal Security Drone", accessed from the Internet on Apr. 2, 2020 from <https://www.youtube.com/watch? =YBLN7zVRLr8>, 3 pages.

\* cited by examiner

AUTOMATED INDIVIDUAL SECURITY

BACKGROUND

1. Technical Field

This invention relates in general to computing systems and more particularly to automated individual security through a wearable aerial device.

2. Description of the Related Art

A drone, also known as an unmanned aerial device or unmanned aircraft system, is a small flying device. Drones come in different sizes, with some drone technology compacted down into small sizes, even less than an inch in width.

BRIEF SUMMARY

In one embodiment, a method is directed to monitoring, by a computer system, for an activation condition through a monitoring interface of a wearable drone. The method is directed to, in response to detecting the activation condition through the monitoring interface, triggering, by the computer system, the wearable drone to release from an aesthetic attachment proximate to a user and hover a distance above the user of a height above a selected height threshold. The method is directed to analyzing, by the computer system, a recording of content by the wearable drone to assess a particular threat level associated with the content from among a plurality of threat levels. The method is directed to, in response to the particular threat level exceeding a threat threshold, automatically sending, by the computer system, a communication to one or more emergency contacts. The method is directed to, in response to the particular threat level exceeding the threat threshold, determining, by the computer system, one or more specific actions associated with the particular threat level. The method is directed to performing, by the computer system, each of the one or more specific actions associated with the particular threat level, wherein at least one of the one or more specific actions comprises dynamically adjusting a position of the wearable drone to a second height above a second height threshold of at least a minimum height to avoid interception by another user.

In another embodiment, a computer system comprises one or more processors, one or more computer-readable memories, one or more computer-readable storage devices, and program instructions, stored on at least one of the one or more storage devices for execution by at least one of the one or more processors via at least one of the one or more memories. The stored program instructions comprise program instructions to monitor for an activation condition through a monitoring interface of a wearable drone. The stored program instructions comprise program instructions to, in response to detecting the activation condition through the monitoring interface, trigger the wearable drone to release from an aesthetic attachment proximate to a user and hover a distance above the user of a height above a selected height threshold. The stored program instructions comprise program instructions to analyze a recording of content by the wearable drone to assess a particular threat level associated with the content from among a plurality of threat levels. The stored program instructions comprise program instructions to, in response to the particular threat level exceeding a threat threshold, automatically send a communication to one or more emergency contacts. The stored program instructions comprise program instructions to, in response to the particular threat level exceeding the threat threshold, determine one or more specific actions associated with the particular threat level. The stored program instructions comprise program instructions to perform each of the one or more specific actions associated with the particular threat level, wherein at least one of the one or more specific actions comprises dynamically adjusting a position of the wearable drone to a second height above a second height threshold of at least a minimum height to avoid interception by another user.

In another embodiment, a computer program product comprises a computer readable storage medium having program instructions embodied therewith, wherein the computer readable storage medium is not a transitory signal per se. The program instructions are executable by a computer to cause the computer to monitor, by a computer, for an activation condition through a monitoring interface of a wearable drone. The program instructions are executable by a computer to cause the computer to, in response to detecting the activation condition through the monitoring interface, trigger, by the computer, the wearable drone to release from an aesthetic attachment proximate to a user and hover a distance above the user of a height above a selected height threshold. The program instructions are executable by a computer to cause the computer to analyze, by the computer, a recording of content by the wearable drone to assess a particular threat level associated with the content from among a plurality of threat levels. The program instructions are executable by a computer to cause the computer to, in response to the particular threat level exceeding a threat threshold, automatically send, by the computer, a communication to one or more emergency contacts. The program instructions are executable by a computer to cause the computer to, in response to the particular threat level exceeding the threat threshold, determine, by the computer, one or more specific actions associated with the particular threat level. The program instructions are executable by a computer to cause the computer to perform, by the computer, each of the one or more specific actions associated with the particular threat level, wherein at least one of the one or more specific actions comprises dynamically adjusting a position of the wearable drone to a second height above a second height threshold of at least a minimum height to avoid interception by another user.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
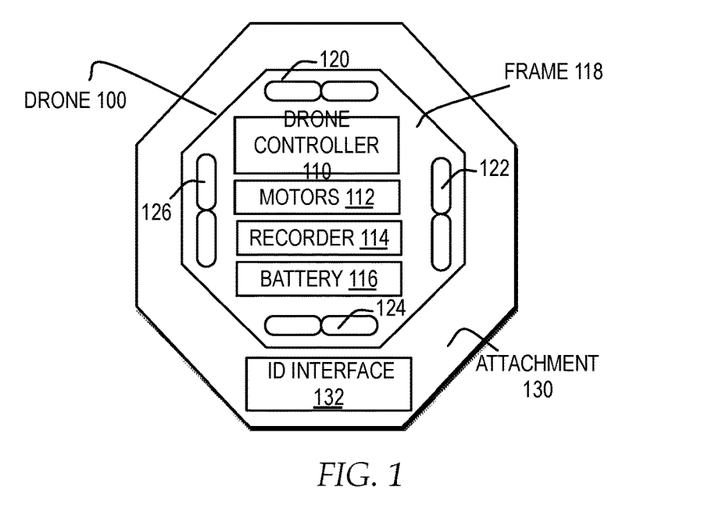
FIG. 1 is a block diagram illustrating one example of a system for a wearable drone that supports automated individual security.

FIG. 1 illustrates a block diagram of one example of a system for a wearable drone that supports automated individual security.

In one embodiment, a drone 100 represents an aerial unmanned device or flying device, including one or more elements for managing the rotational speed and direction of one or more propellers, such as propeller 120, propeller 122, propeller 124, and propeller 126, to control a flight path of drone 100. In one example, propeller 120, propeller 122, propeller 124, and propeller 126 are driven by one or more motors 112, powered by a battery 116. In one example, a drone controller 110 sends signals to motors 112, to direct motors 112 to control speed and direction of rotation of each of the propellers to control the flight path of drone 100.

In the embodiment, the components of drone 100, such as drone controller 110, motors 112, recorder 114, battery 116, propeller 120, propeller 122, propeller 124, and propeller 126, are attached to a frame 118. In the example, frame 118 is detachably connected to attachment 130. In one example, one or more of frame 118 and attachment 130 include connectors for temporarily attaching frame 118 to attachment 130. For example, frame 118 may include latches that are controlled by motors 112 to attach to or detach from pins on attachment 130. In another example, frame 118 includes magnets that are selectively activated by drone controller 110 to connect to magnets on attachment 130 and selectively deactivated by drone controller 110 to disconnect from magnets on attachment 130.

In the embodiment, attachment 130 represents an aesthetic attachment that is removably affixable to a user. For example, attachment 130 may include a backing or other attachment to support removeable wear by a user as a hairpin in one's hair, as a brooch on clothing or a bag, as a tie tack affixed to a tie, or jewelry wearable by a user. In one example, drone 100 is configured to removably attach to attachment 130, with a size of drone 100 minimized to integrate into a wearable item in a manner such that when drone 100 is attached to attachment 130, the wearable item is visually identifiable as the type of wearable item and drone 100 obscured by being visually integrated into the design or style of the wearable item.

In the embodiment, attachment 130 includes an identifier (ID) interface 132, which enables communication between drone controller 110 and attachment 130. In one example, ID interface 132 implements a selectable option for pairing drone 100 to attachment 130. In one example, drone controller 110 may detect a signal broadcast from ID interface 132 to monitor the relative location of drone controller 110 in relation to ID interface 132. In another example, ID interface 132 may enable communications to one or more other devices, such as broadcasting a communication detectable by a local communication device or network and may control an output interface. In one example, ID interface 132 is trackable via wireless network broadcasting or transmissions in order to track a user wearing attachment 130 when drone 100 is detached from attachment 130.

In one example, drone controller 110 manages automated individual security through wearable drone 100. A user may encounter different types of scenarios in which the needs individualized security while traveling, such as a user walking, biking, or riding public transportation, or in a user's home or business environment. In one example, drone controller 110 is enabled to monitor, while drone 100 is attached to attachment 130 and affixed to a user, for conditions surrounding drone 100 indicative of an activation condition, indicating a potential threat or emergency situation where the user may need one or more types of assistance. In response to detecting an emergency condition, drone controller 110 triggers drone 100 to release from attachment 130 and fly to a first threshold elevation above the user, while recording content within the environment surrounding the user. An advantage of implementing drone 100 for individualized security is that drone 100 monitors for sounds or movements indicating an activation condition and therefore drone 100 may be automatically activated based on sounds and motions in a user's environment, rather than being dependent upon a user to manually activate drone 100, which may be difficult or not possible depending on the threat or emergency. In one example, drone controller 110 analyzes the recordings to assess, based on the recorded content in the environment, a threat level associated with the recorded content and responds to the assessed threat level. An advantage of drone 100 assessing recordings to determine a threat level is that a user is not required to manually activate a particular threat level. In addition, by analyzing recordings, drone 100 may determine whether or not an activation condition that triggered drone 100 begin monitoring represents a situation that requires response, to avoid false alarms to emergency services that might occur if a user solely pressed a button to activate a call to emergency services. In one example, a response to the assessed threat level includes drone 100 returning to attachment 130. In another example, a response to the assessed threat level includes elevating the height or other position of drone 100 to move out of reach by other persons around the user to which attachment 130 is still affixed such that another person causing the assessed threat is not able to intercept or destroy drone 100. In one example, a response to the assessed threat level also includes streaming the recordings to a centralized safety service, where the recordings may be reviewed by emergency personnel or others to assist in response to the threat and identifying the participants in a threat.

In one example, in minimizing the size of drone 100 to integrate into a wearable item, the size and functionality of one or more components affixed to drone 100 may also be minimized. For example, a size and battery life of battery 116 may be minimized to integrate into the size of drone 100, however represent a size of battery that at a minimum can power the other components of drone 100 to enable a particular level of service of drone 100 that effectively supports use of drone 100 for individual security including, but not limited to, an expected number of hours of monitoring conditions surrounding drone 100 for conditions indicative of an emergency condition, an expected height, speed, and length of flight of drone 100, an expected amount of storable data by recorder 114 and expected length of time recorder 114 may operate, and an expected amount of communications supported. In another example, a design and selection of motors 112 and propeller 120, propeller 122, propeller 124, and propeller 126, may be minimized to integrated into the size of drone 100, however represent flight infrastructure that effectively supports use of drone 100 for individual security, including, but not limited to, a minimum flight height and minimum flight speed to ensure that drone 100 is able to move away from being easily captured during a threat.

In one example, a user may selectively adjust the pairing of drone 100 from attachment 130 to a different attachment and may selectively adjust the pairing of a new drone to attachment 130. For example, a user may purchase multiple attachments to wear at different times and selectively pair drone 100 to the attachment currently worn by the user. In another example, a user may replace a drone originally paired with attachment 130 with a new drone and selectively pair the new drone with attachment 130 to enable replacement of damaged or outdated drones for base attachment pieces.

Figure 2:
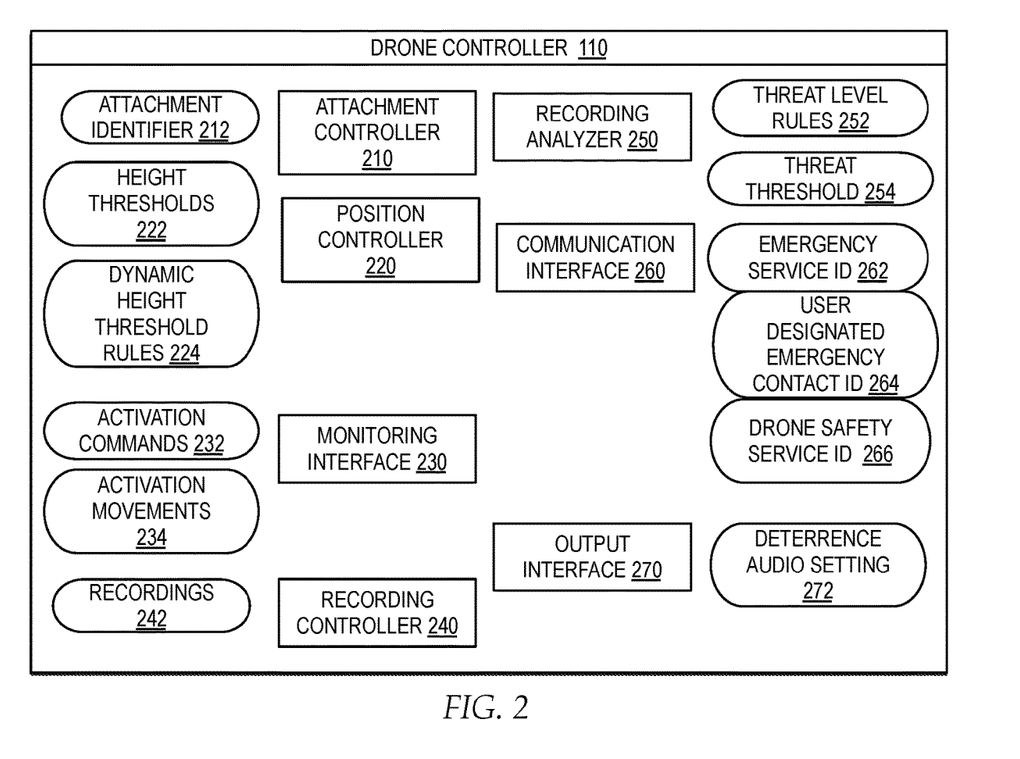
FIG. 2 is a block diagram illustrating one example of a system for an onboard drone controller of a wearable drone for managing automated individual security through the wearable drone.

FIG. 2 illustrates a block diagram of one example of a system for an onboard drone controller of a wearable drone for managing automated individual security through the wearable drone.

In one embodiment, drone controller 110 includes an attachment controller 210 and an attachment identifier 212. In one example, attachment controller 210 control attachment of frame 118 of drone 100 to attachment 130 and detachment of frame 118 from attachment 130. In one example, attachment identifier 212 identifies a detectable identifier of attachment 130.

In one embodiment, drone controller 110 includes a position controller 220 for controlling a position of drone 100 when released from attachment 130. In one example, position controller 220 selects to direct motors 112 to control the elevation of drone 100 to an elevation set in height thresholds 222 set in drone controller 110. In one example, height thresholds 222 may include one or more thresholds, each selectable to a height in relation to one or more bases, such as, but not limited to, a position of attachment 130, a top of a user's head, and a ground level. In one example, position controller 220 may implement a visual recognition model that is trained with recordings of the user to quickly identify a current position of a user's head when positioning drone 100 a particular height above a user's head.

In one embodiment, height thresholds 222 includes one or more preselected height settings, such as a first setting to a four foot height and a second setting to a seven foot height. In another example, position controller 220 dynamically selects one or more of the threshold setting in height thresholds 222 based on dynamic height threshold rules 224. For example, dynamic height threshold rules 224 may specify rules for selecting a threshold based on one or more of a threat level assessed by a recording analyzer 250 of drone controller 110, a height of one or more other persons within a recordable area as assessed by recording analyzer 250, and one or more additional factors or indicators assessed about a recorded environment. In one example, height thresholds 222 may specify one or more of a vertical height and a horizontal height relative to one or more particular types of points.

In one example, a first height set in height thresholds 222 may represent a height determined to position drone 100 a distance away from the user wearing attachment 130 in a manner most effective to facilitate a scope of capture of content by recorder 114 with a high probability of including content indicative of an initial level of threat to the user wearing attachment 130. In one example, additional heights set in height thresholds 222 may represent heights determined to position drone 100 a distance outside of a range of possible capture by another person, while still facilitating a scope of capture of content by recorder 114 that allows for capture of content indicative of an ongoing level of threat to the user wearing attachment 130.

In one embodiment, a monitoring interface 230 of drone controller 110 monitors for inputs indicative of a command to activate drone controller 110 to release drone 100 from attachment 130 and to trigger drone controller 110 to manage individual security monitoring and response. In one example, monitoring interface 230 may monitor inputs that are activation conditions, indicative of a command to activate drone controller 110 to release drone 100 and to trigger drone controller 110 to manage individual security monitoring and response through monitoring audio, motion, video, altimeter, and selections of a tactile input interface. In one example, attachment 130 or drone 100 may include a tactile input interface, such as a selectable button, that when pressed by a user, signals to monitoring interface 230 to release drone 100 from attachment 130. In one example, attachment 130 or drone 100 may include one or more sensors, such as in recorder 114, that detect one or more of audio inputs and detects movements or motion.

In one example, monitoring interface 230 may monitor for specific types of content within detectable audio inputs based on commands specified in activation commands 232 and within detectable movements based on movements specified in activation movements 234. In one example, activation commands 232 specify the types of verbal commands, which if detected within audio detected by monitoring interface 230, represent activation conditions indicating the user is triggering drone controller 110 to manage individual security monitoring and response. In addition, in one example, activation movements 234 specify the types of movements, which if detected within movements detected by monitoring interface 230, indicate the user is triggering drone controller 110 to manage individual security monitoring and response. In one example, a user wearing drone 100, as attached to attachment 130, selectively specifies one or more voice commands in activation commands 232 and one or more motions in activation movements 234 to a selection of commands and motions that customize the response of drone 100, to increase the probability that only actions intended by the user wearing drone 100 to trigger drone 100 to release from attachment, thus improving the individual security monitoring performance of drone 100. In one example, activation commands 232 may include a noise made by the user above a particular threshold or a particular word spoken by the user and activation movements 234 may include a sudden drop or fall by the user.

In one example, recording controller 240 manages controlling recorder 114 and locally storing recordings 242. In one example, recording controller 240 may manage recording of one or more types of content, including, but not limited to, audio, video, tactile inputs, motion, and other types of inputs that are sensed by recorder 114. In one example, recorder 114 implements an infrared video camera, to enable capture of identifiable images that can be analyzed for threat assessments even when the surrounding lighting is low. In one example, recording controller 240 may monitor and temporarily store one or more of audio and video inputs in recordings 242, for use by monitoring interface 230 in monitoring for particular types of activation inputs. In another example, recording controller 240 may initiate longer term storage of one or more of audio and video inputs in response to detecting drone 100 detach from attachment 130.

In one example, based on size and weight limitations of drone 100 to enable flight on a minimally sized frame, elements such as a memory storage for recorder 114 may be minimized as well, and limited to storing a certain amount of data. Recording controller 240 may set the compression or other resolution control of audio and video captured by recorder 114 and stored in recordings 242 to maximum the length of audio and video stream captured. In another example, recording controller 240 may temporarily adjust the resolution of audio, such as by adjusting the audio sensitivity, and may adjust the resolution and focal point of video, based on a threat level assessed by recording analyzer 250.

In one example, recording analyzer 250 analyzes recordings 242 to assess the content of recordings 242 and determine a threat level reflected in the content according to threat level rules 252. In one example, threat level rules specify one or more rules for determining a threat level from among multiple threat levels and for responding to each threat level determination. For example, threat level rules may specify one or more rules for defining threat levels over a range from "0" to "10", where "0" indicates no threat and "10" represents a highest threat level.

In one example, a threat threshold 254 specifies a threshold threat level required before further action is triggered. In one example, a user may selectively adjust threat threshold 254 to minimize the potential for sending communications to emergency services for content that most likely indicates a false alarm. For example, if threat threshold 254 is set to "2", then for a threshold threat level of "0" or "1", recording analyzer 250 triggers position controller 220 to return drone 100 to attachment 130. If the threat level is not less than threat threshold 254, then recording analyzer 250 triggers additional actions.

In one example, threat level rules 252 may specify, for each threat level, one or more actions to be triggered, including, but not limited to, triggering position controller 220 to return drone 100 to attachment 130 or move drone 100 to a new position less susceptible to interception, triggering a communication interface 260 to stream recordings 242 for storage, send emergency alerts and other communications, or trigger an audio deterrence output. In one example, by streaming recordings 242 for storage, recordings 242 are available for use by others, such as emergency personnel, to identify the parties involved in a threat and provide evidence of a threat situation.

In addition, recording analyzer 250 determining a threat level, recording analyzer 250 also considers the type of activation input that triggered monitoring interface 230 to dispatch drone 100 to provide individual security. In one example, threat level rules 252 may specify selected commands and movements from activation commands 232 and activation movements 234 that, if detected, are automatically associated with a particular threat level or automatically indicate whether to decrease or increase the threat level assessment.

In one example, communication interface 260 manages one or more types of wireless network communications. In one example, communication interface 260 may support communications over one or more types of wireless networks including, but not limited to, radio broadcast networks, cell phone networks, wireless local area networks, wireless sensor networks, and satellite communication networks. For example, communication interface 260 may support short range radio broadcast communications and manage communications over the short range broadcast through a short range network communication protocol, such as Bluetooth, with low power consumption. In addition, communication interface 260 may support long range cellular or local area network communications and manage communications over the long range networks through a network protocol specified for the type of network.

In one example, drone controller 110 includes a specification of at least one emergency service ID 262. In one example, emergency service ID 262 specifies one or more identifiers for one or more emergency services. In one example, the type of network identifier for an emergency service provider may specify the type of network communication to be triggered by communication interface 260 for triggering the emergency service. In one example, an emergency service represents one or more of a local emergency service dispatch service, such as 9-1-1, and a local security service dispatch service, such as a business security service. In one example, emergency service ID 262 may also be specified based on a region that a user is traveling in.

In one example, drone controller 110 includes a specification of at least one user designated emergency contact ID 264, which is selectable by a user. In one example, a user who wears drone 100 selects user designated emergency contact ID 264. In another example, a user may select user designated emergency contact ID 264 on behalf of a user wearing drone 100. In one example, user designated emergency contact ID 264 specifies one or more identifiers for one or more entities or other users to contact in the event that a particular threat level is detected.

In one example, drone controller 110 includes a drone safety service ID 266 identifying at least one drone safety service accessible via one or more of the types of wireless networks for providing for or more individual security services. In one example, drone safety service ID 266 represents a link to an access interface for a cloud based drone safety service. In one example, communication interface 260 manages streaming of recordings 242 to a drone safety service identified by drone safety service ID 266. In one example, communication interface 260 receives threat level analysis from a drone safety service identified by drone safety service ID 266.

In one example, drone controller 110 includes an output interface 270 for managing an audio output. In one example, a deterrence audio setting 272 specifies an audio output level and type of sound associated with a threat level. In response to an assessed threat level by recording analyzer 250 reaching a threshold specified in deterrence audio setting 272, output interface automatically outputs an audible sound at a volume and select a particular type of sound at the volume that may act as a deterrent to a detected threat. In on example, as a threat level increases or decreases, deterrence audio setting 272 may direct output interface 270, correspondingly, to increase or decrease the volume of the audio deterrence output. In one example, an advantage of emitting a deterrence audio output from drone 100 is that the audio output may alert others around a user to the user's need for assistance, if the user is alone, and the audio output may deter another person from physically threating the user because the audio alerts others to the situation.

In one example, threat level rules 252 may specify setting a threat level of "2" if the recorded content indicates a user fell, however a threat level of "10" if the user fell and is also detected as unconscious. In one example, threat level rules 252 may specify setting a threat level of "5" if the recorded contents indicates a user is yelling at a volume above a particular threshold, however a threat level of "10" if the user is yelling at a volume above a particular threshold and another person is physically interacting with the user.

In one example, threat level rules 252 may specify that for lower threat levels, such as a threat level of "0", position controller 220 should be triggered to return drone 100 safely back to attachment 130. In addition, threat level rules 252 may specify that for a lower threat level of "1", recording analyzer 250 should continue to monitor for an additional period of time to determine if the threat level increases. Threat level rules 252 may specify that once a threat level reaches "3" one or more types of communications should be triggered to emergency service ID 262 and user designated emergency contact ID 264, once a threat level reaches "5" recordings should be streamed to a repository, and once a threat level reach "8" a deterrence audio output at a first volume should be triggered.

In one example, when a threat level reaches "3" and one or more types of communications are triggered, a specific type of emergency service may be selected based on the type of threat evaluated for the threat level. For example, if a threat level evaluated based on recorded content is indicative of a primary need for medical assistance, then a medical emergency service contact is selected from among emergency service ID 262. In another example, if a threat level based on recorded content is indicative of a primary need for law enforcement assistance, then a law enforcement emergency service contact is selected from among emergency service ID 262

Figure 3:
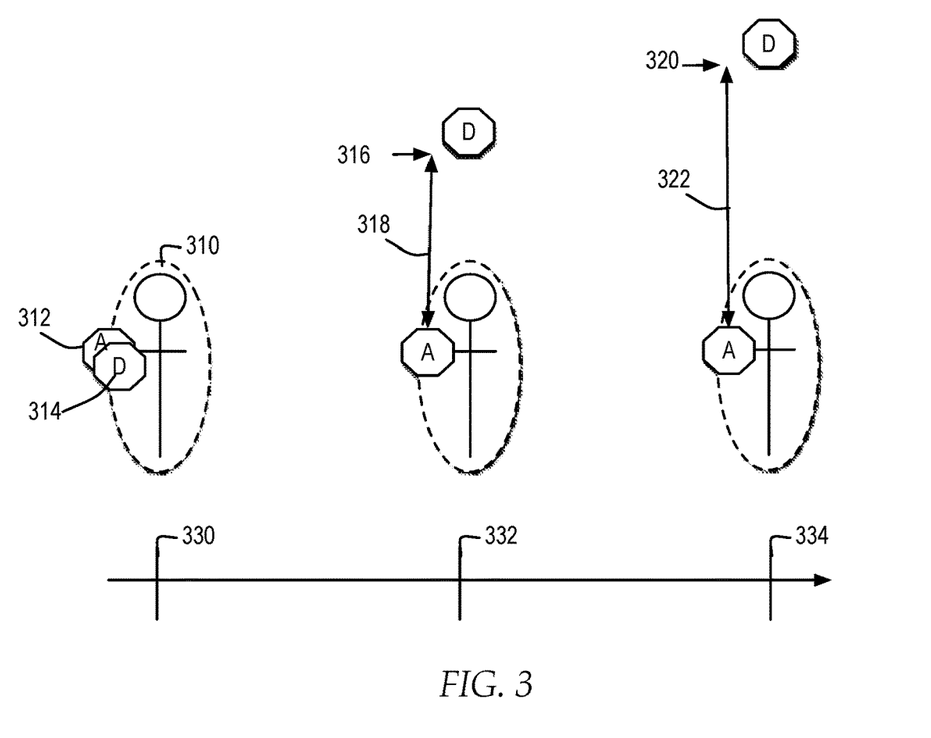
FIG. 3 is a block diagram illustrating one example of an automated movement of a wearable drone for managing automated individual security for a user to move the wearable drone outside the reach of a threat area.

FIG. 3 illustrates a block diagram of one example of an automated movement of a wearable drone for managing automated individual security for a user to move the wearable drone outside the reach of a threat area.

In one embodiment, a user, illustrated by a person in reference numeral 310, at a time 330 is wearing an attachment "A", illustrated at reference numeral 312, to which a wearable drone "D", illustrated by reference numeral 314, is attached. In one example, attachment "A", illustrated at reference numeral 312 may represent an example of attachment 130 and drone "D", illustrated at reference numeral 314 may represent an example of drone 100.

In one example, at a next time 332, user 310 continues to wear attachment "A", however, in response to detecting an activation condition, drone "D" is released from attachment "A" and flown to a position of a height 318 above the position of attachment "A". In one example, height 318 is at least a height above a first threshold 316, where first threshold 316 is selected to position drone "D" in a position to record a particular area around the user to facilitate assessing a threat level of the user's current environment.

In one example, at a subsequent time 334, user 310 continues to wear attachment "A", however, the drone determines that the assessed threat level at time 332 requires movement of drone "D" to a position that is less susceptible to interception. In the example, at subsequent time 334, drone "D" is moved to a position of a height 322 above the position of attachment "A". In the example, height 322 is at least a height above a second threshold 320, where second threshold 320 is selected to position drone "D" in a position higher than first threshold 316, in a position less susceptible to interception.

Figure 4:
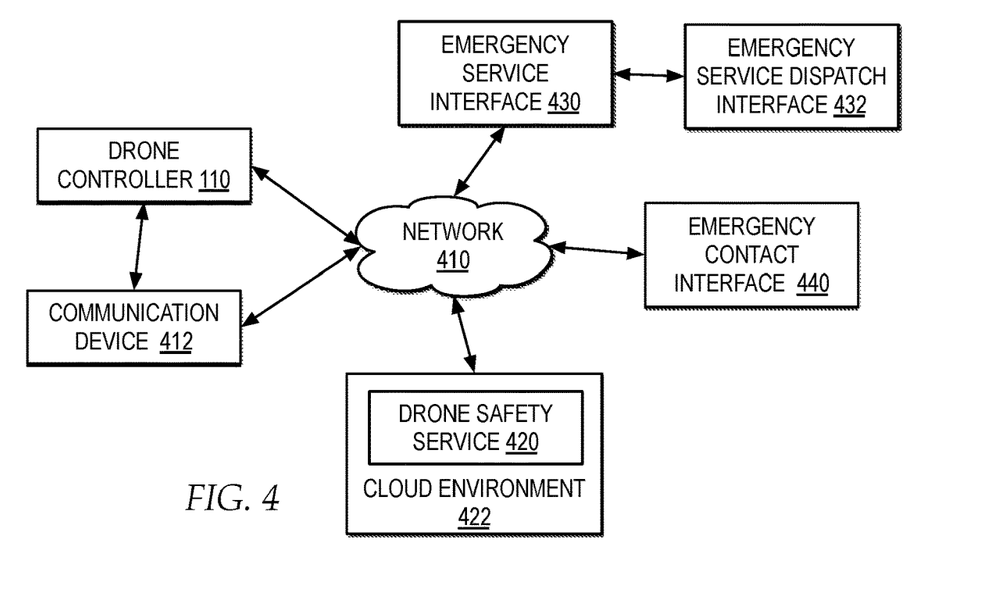
FIG. 4 is a block diagram illustrating one example of a network environment for supporting automated individual security through a wearable drone.

FIG. 4 illustrates a block diagram of one example of a network environment for supporting automated individual security through a wearable drone.

In one example, drone controller 110 may communicate with one or more other systems via a network 410. Network 410 may represent one or more types of wireless networks including, but not limited to, radio broadcast networks, cell phone networks, wireless local area networks, wireless sensor networks, and satellite communication networks. In one example, drone controller 110 wirelessly connects directly with network 410 through communication interface 260. In another example, a user may select to pair communication interface 260 of drone controller 410 to communication device 412 through a short range broadcast network connection, such as a Bluetooth based connection, and to support a connection, through communication device 412, to network 410. For example, communication device 412 may represent a portable communication device that connects to network 410 through a cellular or wireless network supported signal. For example, communication device 412 may represent a portable telephone device carried by the user.

In one example, in response to detecting that a threat level rule triggers communication to an emergency service, drone controller 100 selectively manages an alert message to emergency service interface 430. In one example, emergency service interface 430 represents an interface specified for receiving emergency service calls within a particular area. In one example, multiple emergency service interfaces may be positioned in a particular area and enabled for a short range network communication, including a broadcast, by drone controllers. For example, a drone controller may broadcast an alert message over a short range radio broadcast area, wherein the emergency service interface 430 positioned proximate to drone controller 110 within the short range radio broadcast area receives the broadcast of the alert message.

In one example, in response to detecting that a threat level rule triggers communication to user designated emergency contacts, drone controller 110 selectively manages a communication to the user designated emergency contacts through one or more emergency contact interfaces, such as emergency contact interface 440. In one example, the user designated emergency contacts includes one or more types of contact information, such as, but not limited to, a telephone number and an email address, which determines the type of interface accessed. For example, if a user designated emergency contact is a telephone number, drone controller 110 sends an alert message through a text message or a call to the telephone number and emergency contact interface 440 is a text messaging or telephone call interface for the telephone number. In another example, if a user designated emergency contact is an email address, drone controller 110 sends an alert message through an email and emergency contact interface 440 is an email messaging interface.

In one example, drone controller 110 may analyze captured content locally to assess and determine a threat level or may send the captured content to a drone safety service 420 hosted in a cloud environment 422 or another distributed network environment. In one example, drone safety service 420 includes a remotely accessible recording analyzer, applying the analysis performed by recording analyzer 250 from a remote location. In one example, communication interface 260 of drone controller 110 streams recordings 242 to drone safety service 420 for analysis and threat level detection determination. In one example drone safety service 420 may return an assessed threat level determination to drone controller 110, for drone controller to manage a position of drone 100 and other responses to the threat level determination. Drone safety service 420 may also manage triggering one or more communications based on an assessed threat level determination to emergency service interface 430 and emergency contact interface 440 based on the threat level determination.

In one example, by drone safety service 420 remotely providing analysis of recordings and threat level determination for drone controller 110, drone safety service 420 offers support for a higher level of processing power and processing knowledge to assess threats within content than may be provided for by drone controller 110, given the size and weight limitations of drone 100. In addition, by drone safety service 420 remotely providing analysis of recordings and threat level determination for drone controller 110, the use of battery power on drone 100 is minimized by not requiring consumption of battery power for processing recordings, which may be more power consumptive computations. In addition, by drone safety service 420 remotely providing analysis of recordings and threat level determination for drone controller 110, drone safety service 420 may receive recordings from multiple drones in a particular area and assess a threat level for each individual based on the cumulative impact of a threat within a particular area. In addition, by drone safety service 420 remotely providing analysis of recordings and threat level determination for drone controller 110, drone safety service 420 may receive recordings from multiple drones over time and continue to learn and improve the accuracy of analysis and threat level prediction through user responses to whether threat levels were correctly predicted.

In one example, in response to detecting a threat level rule triggers communication to stream recordings, drone controller 110 selectively manages streaming of the recorded content to drone safety service 420. In one example, drone safety service 420 provides a recording repository for longer term storage of recordings received from drone controller 110. In one example, by drone controller 110 selectively streaming recorded content to drone safety service 420 for storage, recordings from drone 100 are stored in a protected location in the event that drone 100 is damaged or memory space on drone 100 for storing recordings is limited. In addition, by drone controller 110 selectively streaming recorded content to drone safety service 420 for storage, recordings from drone 100 are stored in a repository location that are selectively accessible for review by emergency services and user designated emergency contacts to assist in identifying parties involved in a threat and providing a recording of the threat for additional uses.

Figure 5:
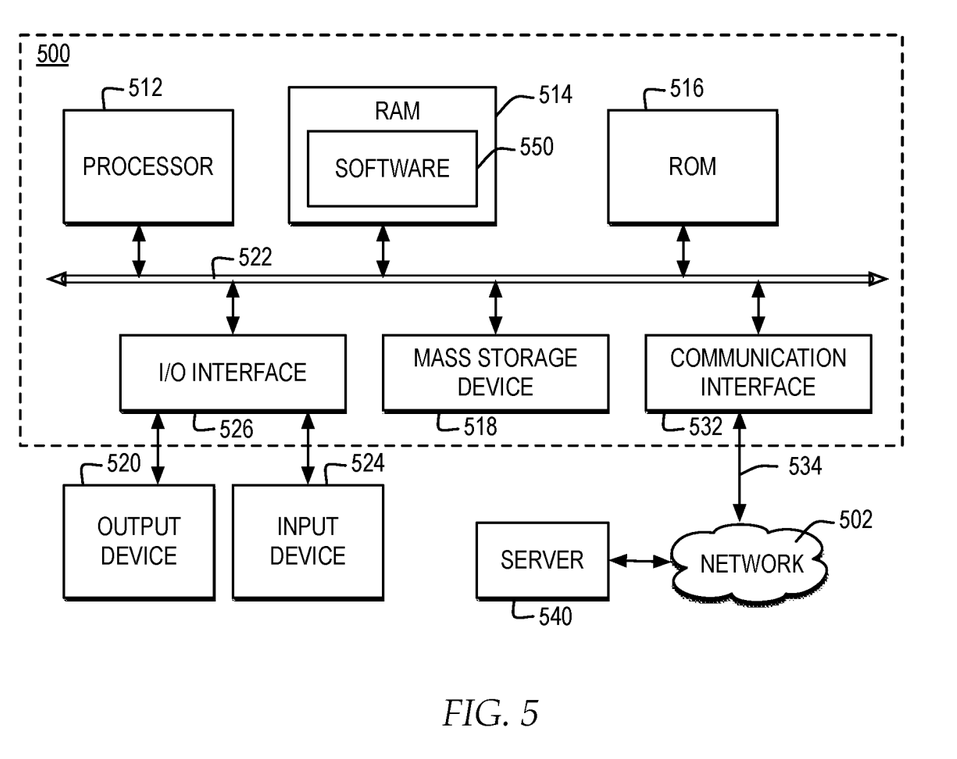
FIG. 5 is a block diagram illustrating one example of a computer system in which one embodiment of the invention may be implemented.

FIG. 5 illustrates a block diagram of one example of a computer system in which one embodiment of the invention may be implemented. The present invention may be performed in a variety of systems and combinations of systems, made up of functional components, such as the functional components described with reference to a computer system 500 and may be communicatively connected to a network, such as network 502.

Computer system 500 includes a bus 522 or other communication device for communicating information within computer system 500, and at least one hardware processing device, such as processor 512, coupled to bus 522 for processing information. Bus 522 preferably includes low-latency and higher latency paths that are connected by bridges and adapters and controlled within computer system 500 by multiple bus controllers. In one embodiment, when implemented as a server or node, computer system 500 includes multiple processors designed to improve network servicing power.

In one embodiment, processor 512 is at least one general-purpose processor that, during normal operation, processes data under the control of software 550, which includes at least one of application software, an operating system, middleware, and other code and computer executable programs accessible from a dynamic storage device such as random access memory (RAM) 514, a static storage device such as Read Only Memory (ROM) 516, a data storage device, such as mass storage device 518, or other data storage medium. In one embodiment, software 550 includes, but is not limited to, code, applications, protocols, interfaces, and processes for controlling one or more systems within a network including, but not limited to, an adapter, a switch, a server, a cluster system, and a grid environment.

In one embodiment, computer system 500 communicates with a remote computer, such as server 540, or a remote client. In one example, server 540 is connected to computer system 500 through any type of network, such as network 502, through a communication interface, such as network interface 532, or over a network link connected, for example, to network 502.

In one embodiment, multiple systems within a network environment are communicatively connected via network 502, which is the medium used to provide communications links between various devices and computer systems communicatively connected. Network 502 includes permanent connections such as wire or fiber optics cables and temporary connections made through telephone connections and wireless transmission connections, for example, and may include routers, switches, gateways and other hardware to enable a communication channel between the systems connected via network 502. Network 502 represents one or more of packet-switching based networks, telephony based networks, broadcast television networks, local area and wire area networks, public networks, and restricted networks.

Network 502 and the systems communicatively connected to computer 500 via network 502 implement one or more layers of one or more types of network protocol stacks which may include one or more of a physical layer, a link layer, a network layer, a transport layer, a presentation layer, and an application layer. For example, network 502 implements one or more of the Transmission Control Protocol/Internet Protocol (TCP/IP) protocol stack or an Open Systems Interconnection (OSI) protocol stack. In addition, for example, network 502 represents the worldwide collection of networks and gateways that use the TCP/IP suite of protocols to communicate with one another. Network 502 implements a secure HTTP protocol layer or other security protocol for securing communications between systems.

In the example, network interface 532 includes an adapter 534 for connecting computer system 500 to network 502 through a link and for communicatively connecting computer system 500 to server 540 or other computing systems via network 502. Although not depicted, network interface 532 may include additional software, such as device drivers, additional hardware and other controllers that enable communication. When implemented as a server, computer system 500 may include multiple communication interfaces accessible via multiple peripheral component interconnect (PCI) bus bridges connected to an input/output controller, for example. In this manner, computer system 500 allows connections to multiple clients via multiple separate ports and each port may also support multiple connections to multiple clients.

Figure 6:
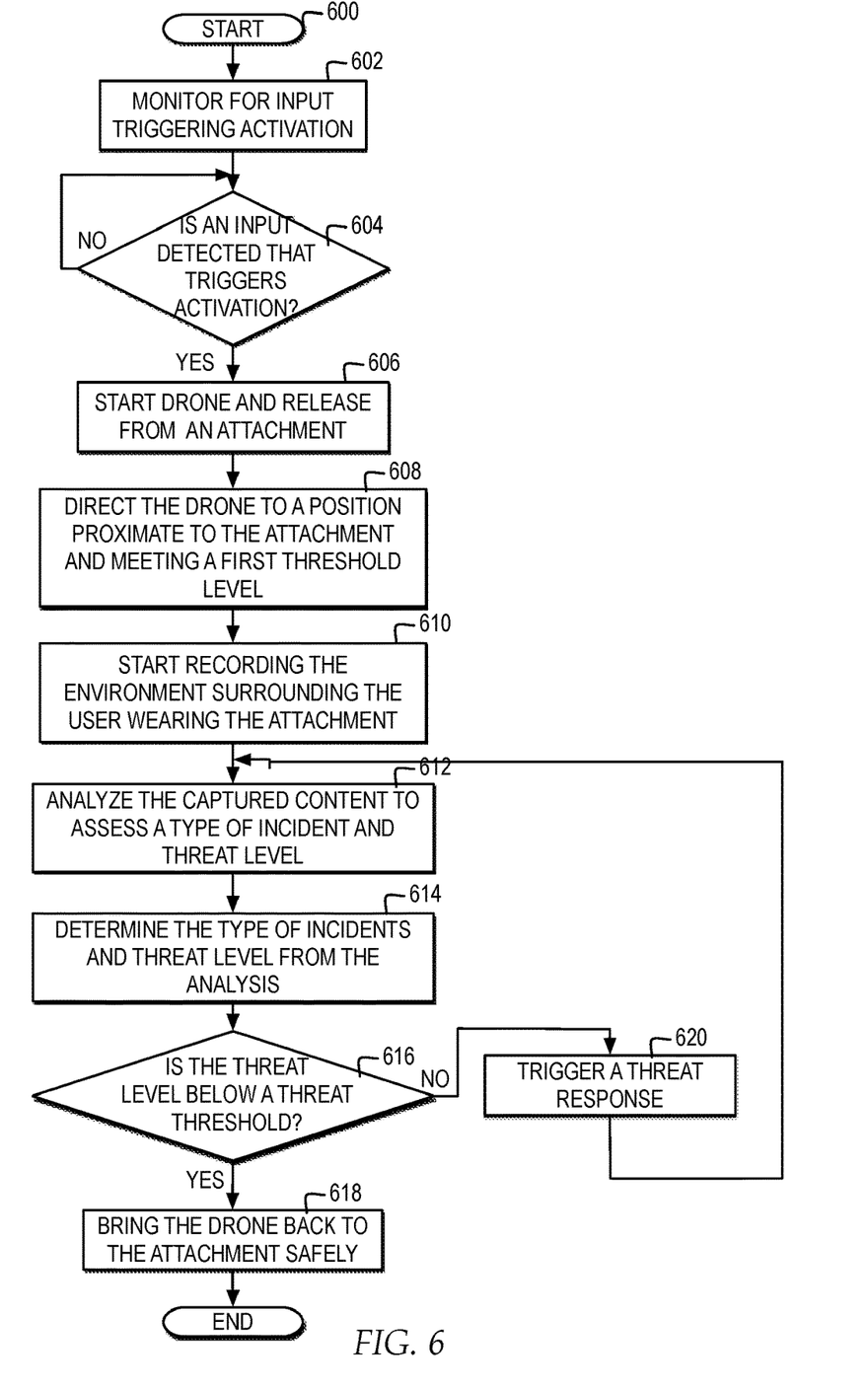
FIG. 6 is a high level logic flowchart illustrating a process and computer program for monitoring for potential threats surrounding a user wearing a wearable drone, assessing a threat level of an environment around the user, and determining whether the threat level presents a type of threat requiring a response.
Figure 7:
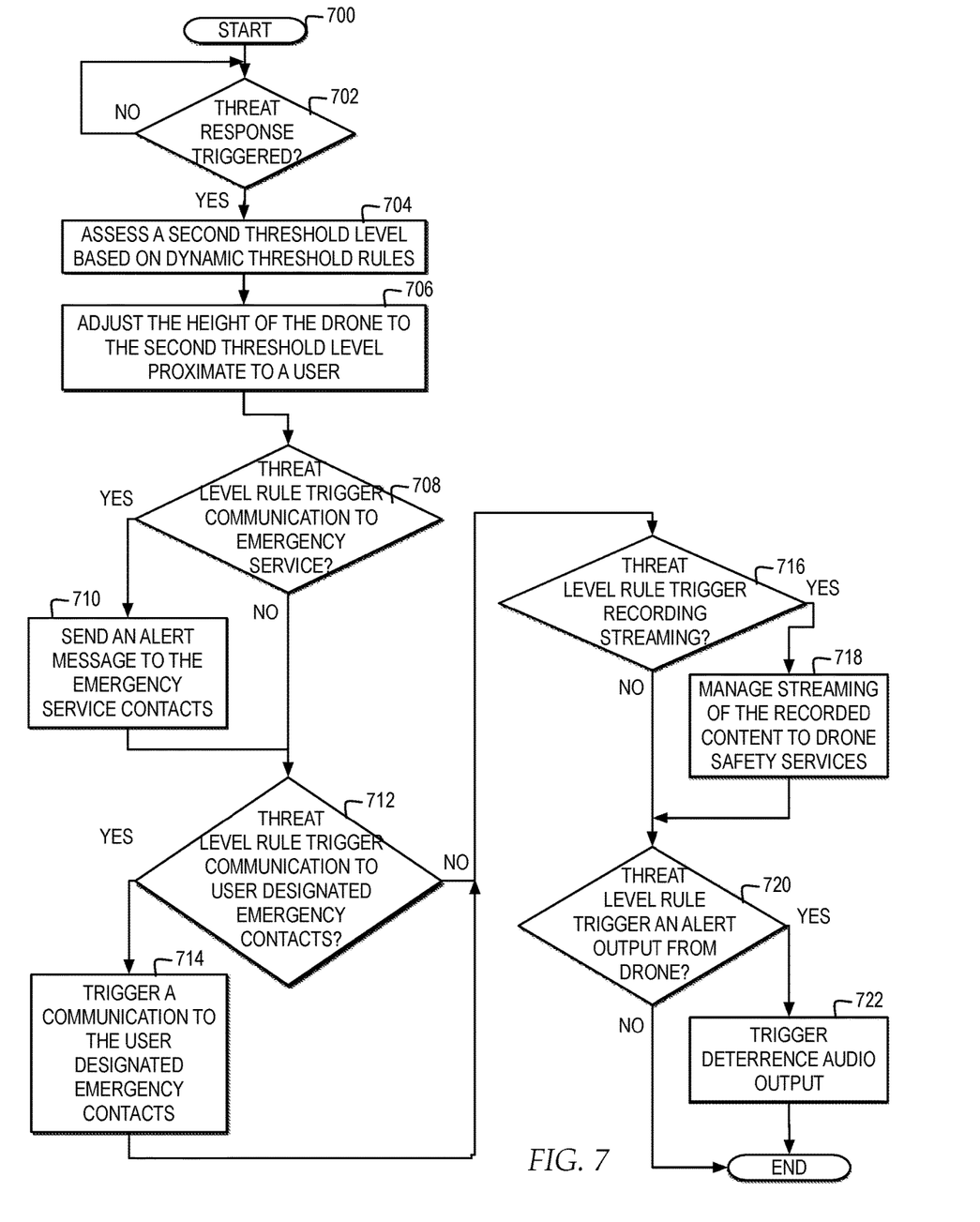
FIG. 7 is a high level logic flowchart illustrating a process and computer program for managing a response to a threat level assessed by a user's environment detected by a wearable drone.

In one embodiment, the operations performed by processor 512 control the operations of flowchart of FIGS. 6-8 and other operations described herein. In one embodiment, operations performed by processor 512 are requested by software 550 or other code or the steps of one embodiment of the invention might be performed by specific hardware components that contain hardwired logic for performing the steps, or by any combination of programmed computer components and custom hardware components. In one embodiment, one or more components of computer system 500, or other components, which may be integrated into one or more components of computer system 500, contain hardwired logic for performing the operations of flowcharts in FIGS. 6-8.

In one embodiment, computer system 500 includes multiple peripheral components that facilitate input and output. These peripheral components are connected to multiple controllers, adapters, and expansion slots, such as input/output (I/O) interface 526, coupled to one of the multiple levels of bus 522. For example, input device 524 includes, for example, a microphone, a video capture device, an image scanning system, a keyboard, a mouse, or other input peripheral device, communicatively enabled on bus 522 via I/O interface 526 controlling inputs. In addition, for example, output device 520 communicatively enabled on bus 522 via I/O interface 526 for controlling outputs include, for example, one or more graphical display devices, audio speakers, and tactile detectable output interfaces, but in another example also includes other output interfaces. In alternate embodiments of the present invention, additional or alternate input and output peripheral components may be added.

With respect to FIG. 5, the one or more embodiments present invention including, but are not limited to, a system, a method, and/or a computer program product. In one embodiment, the computer program product includes a computer readable storage medium (or media) having computer readable program instructions thereon for causing a processor to carry out aspects of the present invention.

In one embodiment, the computer readable storage medium is a tangible device that can retain and store instructions for use by an instruction execution device. The computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (MID), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. In one embodiment, the network comprises copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing, device.

In one embodiment, computer readable program instructions for carrying out operations of the present invention include one or more of assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In one embodiment, the computer readable program instructions execute entirely on the user's computer, partly on the user's computer, as a stand-alone software package, partly on the user's computer and partly on a remote computer or entirely on the remote computer or server. In the latter scenario, in one example, the remote computer is connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that in additional or alternate embodiments, the hardware depicted in FIG. 5 may vary. Furthermore, those of ordinary skill in the art will appreciate that the depicted example is not meant to imply architectural limitations with respect to the present invention.

FIG. 6 illustrates a high level logic flowchart of a process and computer program for monitoring for potential threats surrounding a user wearing a wearable drone, assessing a threat level of an environment around the user, and determining whether the threat level presents a type of threat requiring a response.

In one example, the process and program starts at block 600 and thereafter proceeds to block 602. Block 602 illustrates monitoring for input triggering activation. Next, block 604 illustrates a determination whether an input that is detected that triggers activation. At block 604, if an input is detected that triggers activation, then the process passes to block 606. Block 606 illustrates starting a drone and releasing the drone from an attachment. Next, block 608 illustrates directing the drone to a position proximate to the attachment and meeting a first threshold level. Thereafter, block 610 illustrates starting a content recording of the environment surrounding the user wearing the attachment. Next, block 612 illustrates analyzing the captured content to assess a type of incident and threat level. Thereafter, block 614 illustrates determining the type of incident and threat level from the analysis, and the process passes to block 616.

Block 616 illustrates a determination whether the threat level is below a threat threshold. At block 616, if the threat level is below a threat threshold, then the process passes to block 618. Block 618 illustrates bringing the drone back to the attachment safely, and the process ends. Returning to block 616, if the threat level is not below a threat threshold, then the process passes to block 620. Block 620 illustrates triggering a threat response, and the process passes to block 612.

FIG. 7 illustrates a high level logic flowchart of a process and computer program for managing a response to a threat level assessed by a user's environment detected by a wearable drone.

In one example, the process and program starts at block 700 and thereafter proceeds to block 702. Block 702 illustrates a determination whether a threat response is triggered. At block 702, if a threat response is triggered, then the process passes to block 704. Block 704 illustrates assessing a second threshold level based on dynamic threshold rules to move the drone outside an area susceptible to capture. Next, block 706 illustrates adjusting the height of the drone to the second threshold level proximate to a user, and the process passes to block 708.

Block 708 illustrates a determination whether the threat level rule triggers communication to emergency services. At block 708, if the threat level rule does not trigger communication to emergency services, then the process passes to block 712. Returning to block 708, if the threat level rule does trigger communication to emergency services, then the process passes to block 710. Block 710 illustrates sending an alert message with a threat level indicator to the emergency service contacts, and the process passes to block 712.

Block 712 illustrates a determination whether the threat level rule triggers communication to user designated emergency contacts. At block 712, if the threat level rule does not trigger communication to user designated emergency contacts, then the process passes to block 716. Returning to block 712, if the threat level rule does trigger communication to user designated emergency contacts, then the process passes to block 714. Block 714 illustrates triggering a communication to the user designated contacts, and the process passes to block 716.

Block 716 illustrates a determination whether the threat level rule triggers recording streaming. At block 716, if the threat level rule does not trigger recording streaming, then the process passes to block 720. Returning to block 716, if the threat level rule does trigger communication recording streaming, then the process passes to block 718. Block 718 illustrates managing streaming of the recorded content to drone safety service, and the process passes to block 720.

Block 720 illustrates a determination whether the threat level rule triggers an alert output from the drone. At block 720, if the threat level rule does not trigger an alert output from the drone, then the process ends. Returning to block 720, if the threat level rule does trigger an alert output from the drone, then the process passes to block 722. Block 722 illustrates triggering a deterrence audio output, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to best explain the principles of the invention and the practical application, and to enable others of ordinary skill in the art to understand the invention for various embodiments with various modifications as are suited to the particular use contemplated.

The foregoing description is just an example of embodiments of the invention, and variations and substitutions. While the invention has been particularly shown and described with reference to one or more embodiments, it will be understood by those skilled in the art that various changes in form and detail may be made therein without departing from the spirit and scope of the invention.

What is claimed is:

1. A method comprising:
   monitoring, by a computer system, for an activation condition through a monitoring interface of a wearable drone;
   in response to detecting the activation condition through the monitoring interface, triggering, by the computer system, the wearable drone to release from an aesthetic attachment proximate to a user and hover a distance above the user of a height above a selected height threshold;
   analyzing, by the computer system, a recording of content by the wearable drone to assess a particular threat level associated with the content from among a plurality of threat levels;
   in response to the particular threat level exceeding a threat threshold, automatically sending, by the computer system, a communication to one or more emergency contacts;
   in response to the particular threat level exceeding the threat threshold, determining, by the computer system, one or more specific actions associated with the particular threat level; and
   performing, by the computer system, each of the one or more specific actions associated with the particular threat level, wherein at least one of the one or more specific actions comprises dynamically adjusting a position of the wearable drone to a second height above a second height threshold of at least a minimum height to avoid interception by another user.

2. The method according to claim 1, further comprising:
   detecting, by the computer system, a user wearing the aesthetic attachment, the wearable drone removably attached to the aesthetic attachment, wherein the aesthetic attachment comprises one or more of a hairpin, a brooch, a tie tack, and jewelry.

3. The method according to claim 1, further comprising:
   in response to the wearable drone from the aesthetic attachment, starting, by the computer system, recording through one or more recording devices, the one or more recording devices comprising one or more of an infrared camera, a microphone, and an altimeter.

4. The method according to claim 1, wherein performing, by the computer system, each of the one or more specific actions associated with the particular threat level further comprises:
   issuing, by the computer system, an audio output at a particular volume and a particular sound from the wearable drone.

5. The method according to claim 1, wherein performing, by the computer system, each of the one or more specific actions associated with the particular threat level further comprises:
   dynamically adjusting, by the computer system, a position of the wearable drone to a second height above a second height threshold that adjusts an area captured in the content of the recording from a first area at a first height above the selected threshold to a second area at the second height above the second height threshold.

6. The method according to claim 1, further comprising:
   in response to the particular threat level not exceeding the threat threshold, returning, by the computer system, the wearable drone safely to the aesthetic attachment.

7. The method according to claim 1, wherein in response to the particular threat level exceeding the threat threshold, automatically sending, by the computer system, the communication to the one or more emergency contacts further comprises:
   in response to the particular threat level exceeding the threat threshold according to a visual analysis of the content of the recording, automatically sending, by the computer system, the communication to the one or more emergency contacts, wherein the visual analysis of the content of the recording to assess the particular threat level and compare the particular threat level with the threat threshold reduces the probability of sending the communication for a false positive.

8. A computer system comprising one or more processors, one or more computer-readable memories, one or more computer-readable storage devices, and program instructions, stored on at least one of the one or more storage devices for execution by at least one of the one or more processors via at least one of the one or more memories, the stored program instructions comprising:

program instructions to monitor for an activation condition through a monitoring interface of a wearable drone;
program instructions to, in response to detecting the activation condition through the monitoring interface, trigger the wearable drone to release from an aesthetic attachment proximate to a user and hover a distance above the user of a height above a selected height threshold;
program instructions to analyze a recording of content by the wearable drone to assess a particular threat level associated with the content from among a plurality of threat levels;
program instructions to, in response to the particular threat level exceeding a threat threshold, automatically send a communication to one or more emergency contacts program instructions to, in response to the particular threat level exceeding the threat threshold, determine one or more specific actions associated with the particular threat level; and
program instructions to perform each of the one or more specific actions associated with the particular threat level, wherein at least one of the one or more specific actions comprises dynamically adjusting a position of the wearable drone to a second height above a second height threshold of at least a minimum height to avoid interception by another user.

9. The computer system according to claim 8, further comprising:
program instructions to detect a user wearing the aesthetic attachment, the wearable drone removably attached to the aesthetic attachment, wherein the aesthetic attachment comprises one or more of a hairpin, a brooch, a tie tack, and jewelry.

10. The computer system according to claim 8, further comprising:
program instructions to, in response to releasing the wearable drone from the aesthetic attachment, start recording through one or more recording devices, the one or more recording devices comprising one or more of an infrared camera, a microphone, and an altimeter.

11. The computer system according to claim 8, wherein program instructions to perform each of the one or more specific actions associated with the particular threat level further comprise:
program instructions to issue an audio output at a particular volume and a particular sound from the wearable drone.

12. The computer system according to claim 8, wherein program instructions to perform each of the one or more specific actions associated with the particular threat level further comprise:
program instructions to dynamically adjust a position of the wearable drone to a second height above a second height threshold that adjusts an area captured in the content of the recording from a first area at a first height above the selected threshold to a second area at the second height above the second height threshold.

13. The computer system according to claim 8, further comprising:
program instructions to, in response to the particular threat level not exceeding the threat threshold, return the wearable drone safely to the aesthetic attachment.

14. The computer system according to claim 8, wherein program instructions to, in response to the particular threat level exceeding the threat threshold, automatically send the communication to the one or more emergency contacts further comprise:
program instructions to, in response to the particular threat level exceeding the threat threshold according to a visual analysis of the content of the recording, automatically send the communication to the one or more emergency contacts, wherein the visual analysis of the content of the recording to assess the particular threat level and compare the particular threat level with the threat threshold reduces the probability of sending the communication for a false positive.

15. A computer program product comprises a computer readable storage medium having program instructions embodied therewith, wherein the computer readable storage medium is not a transitory signal per se, the program instructions executable by a computer to cause the computer to:
monitor, by a computer, for an activation condition through a monitoring interface of a wearable drone;
in response to detecting the activation condition through the monitoring interface, trigger, by the computer, the wearable drone to release from an aesthetic attachment proximate to a user and hover a distance above the user of a height above a selected height threshold;
analyze, by the computer, a recording of content by the wearable drone to assess a particular threat level associated with the content from among a plurality of threat levels;
in response to the particular threat level exceeding a threat threshold, automatically send, by the computer, a communication to one or more emergency contacts in response to the particular threat level exceeding the threat threshold, determine, by the computer, one or more specific actions associated with the particular threat level; and
perform, by the computer, each of the one or more specific actions associated with the particular threat level, wherein at least one of the one or more specific actions comprises dynamically adjusting a position of the wearable drone to a second height above a second height threshold of at least a minimum height to avoid interception by another user.

16. The computer program product according to claim 15, further comprising the program instructions executable by a computer to cause the computer to:
detect, by the computer, a user wearing the aesthetic attachment, the wearable drone removably attached to the aesthetic attachment, wherein the aesthetic attachment comprises one or more of a hairpin, a brooch, a tie tack, and jewelry.

* * * * *